United States Patent
Karpinsky et al.

(10) Patent No.: US 6,760,508 B2
(45) Date of Patent: Jul. 6, 2004

(54) FIBER OPTIC SWITCH PROCESS AND OPTICAL DESIGN

(75) Inventors: John R. Karpinsky, San Jose, CA (US); Daniel M. Brown, Huntsville, AL (US); Rodney L. Clark, Huntsville, AL (US)

(73) Assignee: Mems Optical, Inc., Huntsville, AL (US)

(*) Notice: Subject to any disclaimer, the term of this patent is extended or adjusted under 35 U.S.C. 154(b) by 0 days.

(21) Appl. No.: 10/025,460

(22) Filed: Dec. 26, 2001

(65) Prior Publication Data

US 2003/0081887 A1 May 1, 2003

Related U.S. Application Data

(63) Continuation of application No. 09/773,751, filed on Feb. 2, 2001.
(60) Provisional application No. 60/180,138, filed on Feb. 3, 2000.

(51) Int. Cl.[7] .............................. G02B 6/35; G02B 6/32
(52) U.S. Cl. .............................. 385/22; 385/25; 385/35
(58) Field of Search .......................... 385/16–18, 20–22, 385/25, 33–35

(56) References Cited

U.S. PATENT DOCUMENTS 5,923,798 A * 7/1999 Aksyuk et al. ............... 385/19
6,549,703 B1 * 4/2003 Tanielian et al. ............. 385/33
2002/0105699 A1 * 8/2002 Miracky et al. .............. 385/14

OTHER PUBLICATIONS

M. Wu, "Micromachining for Optical and Optoelectronic Systems," Proc. IEEE, vol. 85, No. 11, pp. 1833–1856, Nov. 1997.*

* cited by examiner

Primary Examiner—Hemang Sanghavi
Assistant Examiner—Omar Rojas
(74) Attorney, Agent, or Firm—Keady, Olds & Maier, PLLC (57) ABSTRACT

A method and apparatus for optical switching is described wherein a first optical input/output port and plurality of second optical input/output ports are coupled using an optical guiding assembly. An optical signal may thereby be movably directed between the first input/output port and a selected one of the second optical input/output ports. The optical guiding assembly includes a optical micro-element assembly and an actuator assembly which moveably directs the microlens assembly to a predetermined position corresponding to the selected one of the input/output ports. The actuator assembly includes a comb drive and the optical micro-element assembly includes an etched lens, a ball lens, a mirror, or the like.

6 Claims, 7 Drawing Sheets

FIBER OPTIC SWITCH PROCESS AND OPTICAL DESIGN

This application is a continuation of co-pending application Ser. No. 09/773,751, filed on Feb. 2, 2001, the entire contents of which are hereby incorporated by reference and for which priority is claimed under 35 U.S.C. §120; and this application claims priority of Application No. 60/180,138 filed in U.S.A. on Feb. 3, 2000 under 35 U.S.C. §119.

BACKGROUND OF THE INVENTION

1. Field of the Invention

The present invention is related to fiber optic switching. In particular, the present application is related a micromachine actuated fiber optic switch and a process for making and using same.

2. Description of Related Art

With the rapid growth of the fiber optic based communications and computing, there is now and will continue to be a persistent need for capabilities to switch fiber optic signals. In addition, because of ever decreasing form factors, there is a corresponding need to provide fiber optic switching capabilities in ever smaller package sizes.

Conventional systems for switching or directing fiber optic signals tend to be undesirable in that large mirrors and supporting apparatus are required which give rise to undue expense, unreliability, and inconsistency in optics. Moreover, problems with process control particularly for micromachine parts give rise to inconsistent yield and inconsistency in performance between parts manufactured according to switch design.

Fiber optic switch design and optics design are integrally related because fabrication methods are deeply influenced by the size, shape, and structure of the optics, which factors ultimately determine what methods are feasible. One goal is to minimize assembly costs. However, since fibers used in fiber optic communication are typically manufactured separately from the switch, they must be assembled into a final product. Other parts may also need to be manually placed into a manufactured switch design if necessary and sufficiently simple. Although high volume manufacture may involve robotic assembly, delicate placement and alignment of optical fibers in switch assemblies still poses practical difficulties and costs.

Accordingly, it is would be appreciated in the art for a method and apparatus for switching fiber optic signals and a process for making and using same which overcomes these and other difficulties. Such a method and apparatus would provide for placement and alignment of optical components, such as optical fibers and the like within switch assemblies.

SUMMARY OF THE INVENTION

Therefore in accordance with various exemplary embodiments of the present invention, a method and apparatus for switching optical signals are described. The optical switch of the present invention may include a first optical input/output port, plurality of second optical input/output ports, and an optical guiding assembly coupled therebetween. The optical guiding assembly is preferably configured to moveably direct an optical signal between the first optical input/output port and a selected one of the plurality of second optical input/output ports.

Alternatively, the optical guiding assembly further preferably includes a optical micro-element assembly, and an actuator assembly, which actuator assembly may be mechanically coupled to the optical micro-element assembly and may be configured to moveably direct the optical micro-element assembly to a predetermined position. It should be noted that the predetermined position corresponds to a placement of the actuator sufficient to cause the optical micro-element assembly to direct the optical signal to the selected one of the optical input/output ports.

As will be described in greater detail hereinafter, the optical microelement assembly in accordance with various exemplary embodiments may include various structures capable of directing and or deflecting light signals such as for example, a micro-lens, an etched lens, a ball lens, a mirror, and the like and the actuator assembly may include, for example, a comb drive, which comb drive may be integrated into the substrate through the use of, for example, micro-machining, semiconductor-style device manufacturing techniques, or the like.

Thus in accordance with various exemplary embodiments an actuating assembly may be integrated into the substrate and an optical micro-element integrated into the actuating element. The process used for integration may include Deep Reactive Ion Etching (DRIE). It should be noted that the optical micro-element has an optical axis parallel to a horizontal plane associated with the substrate and accordingly the actuating assembly is configured to move the optical micro-element within the horizontal plane. The switch assembly may preferably include a first input/output port and a plurality of second input/output ports. The optical signal is directed to a selected one of the plurality of second input/output ports from the first input/output port by moving the optical micro-element within the horizontal plane in a direction perpendicular to the optical axis using the actuating assembly. In order to control the movement and precision of the actuating assembly a feedback controller and a plurality of sensors may be used. Accordingly, one of the plurality of sensors corresponding to the selected input/output port generates a feedback signal associated with, for example, a level of alignment of the optical signal. It will be appreciated that signal intensity maxima, for example, may be used as an indication of alignment. The feedback signal may then be used to correct the position of the actuator assembly so as to correct the level of alignment.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE INVENTION

A micro-machine actuator in accordance with exemplary embodiments of the present invention may be fabricated using single crystal silicon. Exemplary fabrication processes use Deep Reactive Ion Etching (DRIE) to configure the silicon and the micro-machine actuators as is described in greater detail in U.S. Provisional Application No. 60/238,437 entitled "DEEP GRAYSCALE ETCHING OF SILICON" filed Oct. 10, 2000 which document is incorporated herein by reference. Exemplary optics may be made using a suitable grade of optical glass such as, for example, Borosilicate Crown Glass, e.g. BK7 grade A optical glass, BAF10, SKN8, SK11, sapphire, or the like as would be known to one of skill in the art. Thus, for the purpose of discussion, BK7 glass balls may be used as ball lenses in accordance with various exemplary embodiments of the present invention although other grades of glass may be used for ball lenses as discussed hereinabove. BK7 optical glass balls may be manually placed in receptacles in the etched silicon. Fibers may be manually placed in grooves in the silicon that will guide them to the proper position as is discussed in greater detail in U.S. patent application Ser. No. 09/556,793.

It should be noted that an exemplary baseline design in accordance with various exemplary embodiments of the present invention uses a single mode fiber with a numerical aperture of approximately 0.13, a core diameter of 8 to 12 microns, and a cladding diameter of 125 microns. Exemplary processes in accordance with the present invention can work with other configurations, but the base line configuration as described is both highly manufacturable and highly useful for bi-directional fiber telecommunications.

Figure 1A:
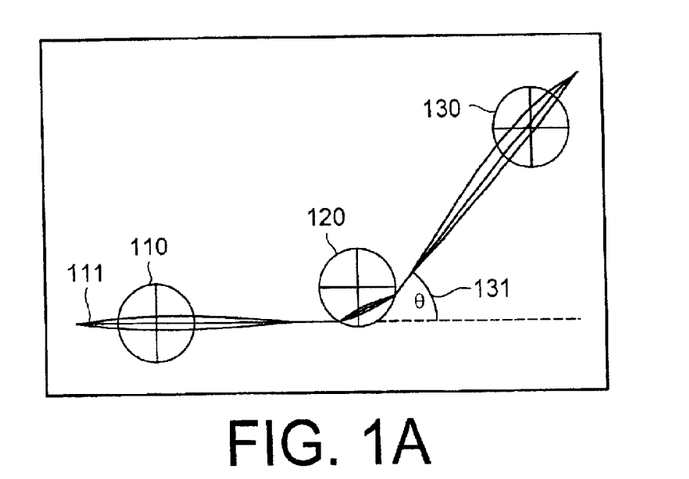
FIG. 1A is a diagram illustrating an exemplary ball lens in accordance with the present invention in a deflection position.
Figure 1B:
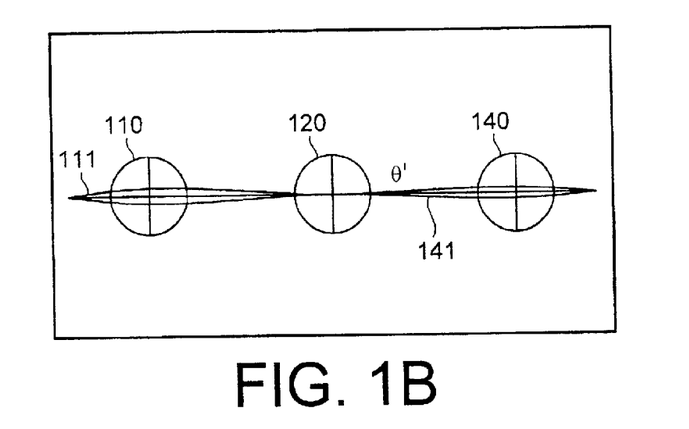
FIG. 1B is a diagram illustrating an exemplary ball lens in accordance with the present invention in a center position.
Figure 1C:
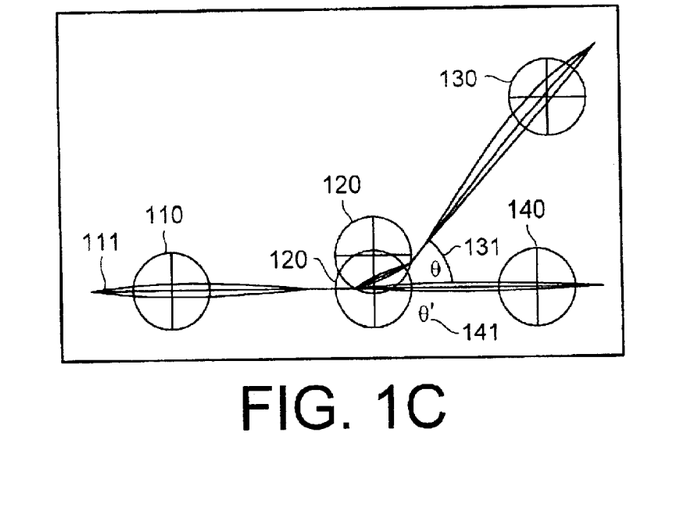
FIG. 1C is a diagram illustrating an exemplary composite of FIG. 1a and FIG. 1b in accordance with the present invention.

Various views of an exemplary optical design in accordance with the present invention are illustrated in FIGS. 1A–1C. In this exemplary design, optical micro-elements may include ball lenses. It should be noted that ball lenses are shown in FIGS. 1A–1C from the top view. FIG. 1A shows input ball lens 110 associated with input signal 111, and movable ball lens 120 imposing a maximum deflection to the left position of input signal 111 to output ball lens 130 at angle $\Theta$ 131. FIG. 1B shows input ball lens 110 associated with input signal 111 and movable ball lens 120 in a center position such that input signal 111 is directed toward output ball lens 140 at angle $\Theta'$ 141. FIG. 1C shows a composite of both positions illustrated in FIG. 1A and FIG. 1B showing the relative position changes of movable ball lens 120.

It should be noted that while FIGS. 1A–1C described above show movable ball lens 120 in a center position and one extreme deflection position, movable ball lens 120 may be used to deflect the input beam to a maximum deflection position in the other direction, e.g. $-\Theta$ 131 (not shown). Thus, the maximum angle for $\Theta$ 131 is preferably about +/−48 degrees. Maximum deflection parameters along with factors such as, for example, the size of optical fibers, sets the distances and the number of fibers that can be handled in a switch in accordance with the present invention. Accordingly, the optical design as is partially illustrated in FIGS. 1A–1C forms the basis for an exemplary micro-machine actuator design capable of moving, for example, movable ball lens 120 to deflect a light signal such as input signal 111 from one input fiber to one of several output fibers. While several variations are possible in accordance with various exemplary embodiments of the present invention, switches having a smaller number of output fibers allow for the widest tolerances for component dimensions and placement accuracy.

It should further be noted that while movable ball lens 120 is shown directing input signal 111 to various positions, it is contemplated that various exemplary embodiments in accordance with the present invention may include a variety of optical guiding devices or optical microelements such as lenses, mirrors, facets, diffraction gratings, and the like capable of directing an optical signal to one or more optical input/output ports. For example, as will be described in greater detail herein after, movable ball lens 120 may be replaced with one or more etched lenses. As will be appreciated by those skilled in the art, many alternative devices may be constructed having lens like properties. However, it should be understood that devices other than lenses, such as, for example, mirrors and the like may also be used to direct light signals in accordance with the present invention.

Figure 2A:
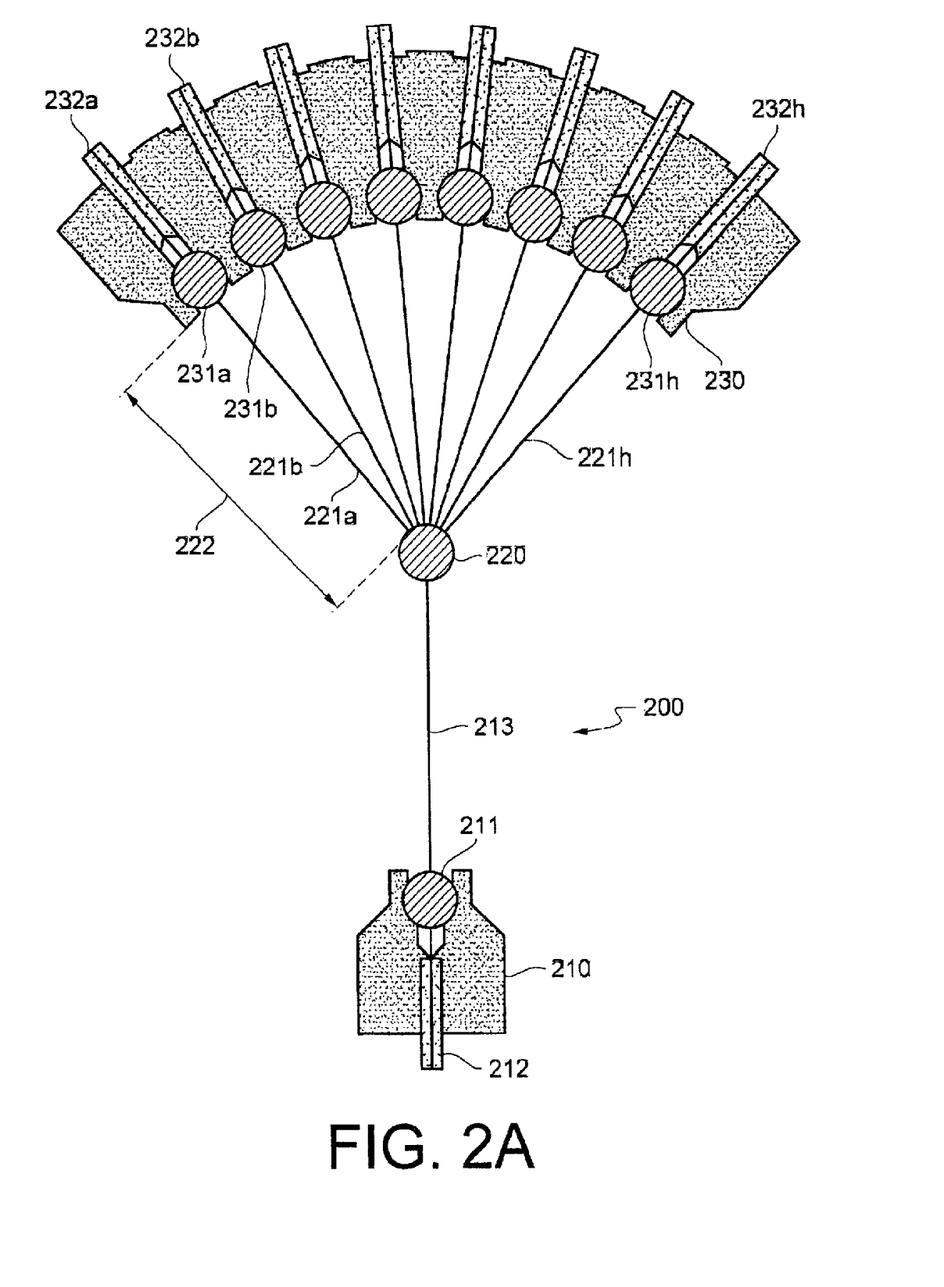
FIG. 2A is a diagram illustrating a top view of an exemplary layout of a lens position and fiber positions in accordance with the present invention.

The exemplary implementation shown schematically in FIG. 2A is for eight-to-one switch 200. Input fiber 212 may be coupled into base 210 having ball lens 211 for focusing input signal 213. While an actuator is not shown, movable ball lens 220 may be moved to deflect input signal 213 to one of the output fibers 232a–232h. Thus deflected signals 221a-221h may be transmitted to corresponding output ball lenses 231a–231h which are secured in based 230 and may be coupled to corresponding output fibers 232a–232h. Again it should be noted that while several signals 221a–221h are shown simultaneously, input signal 213 is preferably deflected to only one output position at a time.

The exemplary optical design uses spheres preferably of 300 micron diameter for ball lenses such as ball lens 211, 220, and 231a–231h. Distance 222 from the center movable ball lens 220 to ball lenses 231a–231h placed at the fiber apertures of base 230 is 1.9 mm for the exemplary eight-to-one switch 200 resulting in an actuator chip size of approximately 4 by 6 mm including space for bonding pads and fiber holders. As will be appreciated by those skilled in the art, the cost of larger switches will be greater than the cost of the smaller switches, but all are well within the limits of manufacturing.

Figure 2B:
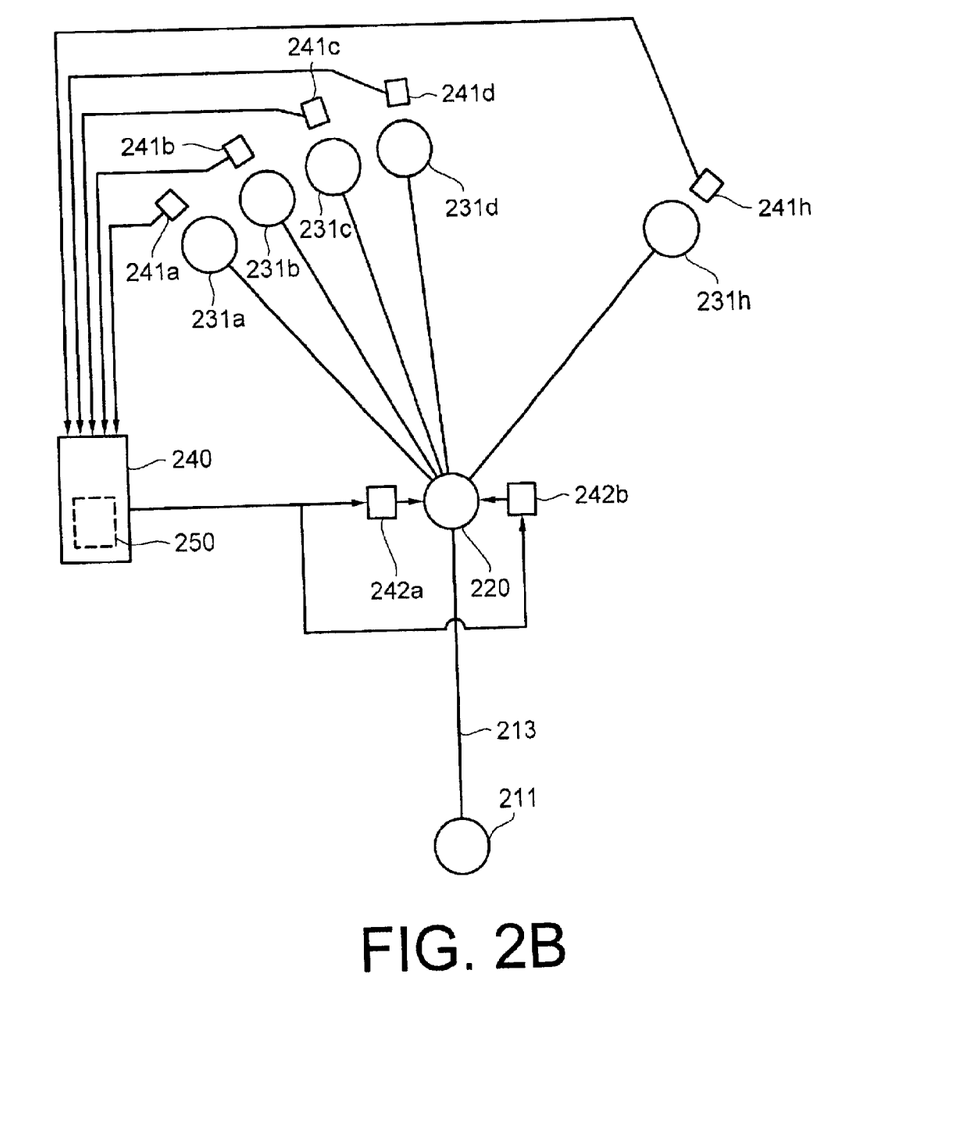
FIG. 2B is a diagram illustrating the exemplary layout shown in FIG. 2A and further illustrating an exemplary feedback mechanism in accordance with the present invention.

It should be noted that while FIGS. 2A and 2B illustrates signal 213 carried on an exemplary single fiber input being switched to one of several fiber outputs, the present invention allows for several inputs to be switched to a single output. Further, signal 213 may include bi-directional communication signals as are known in the art and which may, for example, be multiplexed in the time domain or the like such that input and output may both be conducted in accordance with the present invention. In addition, the position of, for example, movable ball lens 220 may be controlled through the use of a feedback mechanism as illustrated in FIG. 2B.

Thus in accordance with various exemplary embodiments, the position of, for example, movable ball lens 220 may be controlled through feedback processor 240, which may be a separate processor, an analog circuit, a software routing in a central processing core or the like as would be appreciated by one skilled in the art. Optical signal 213 may be directed to one of the input/output ball lenses 231a–231h by applying a control voltage to actuator elements 242a and 242b which may be part of, for example, a comb drive as will be described in greater detail hereinafter. Feedback processor 240 preferably receives a feedback value of some kind such as, for example, a voltage level, from sensors 241a–241h, which sensors may provide an indication of a factor related to the intensity level of optical signal 213. In this way, directional alignment of movable ball lens 220 may be achieved with a high degree of precision. It will further be appreciated that the control voltage applied to actuating elements may take a variety of forms including, for example, step voltages, continuous analog voltages, or the like, or a hybrid of many forms of control signal. It will further be appreciated that in accordance with a preferred embodiment, feedback processor 240 may also contain memory 250 for storing predetermined feedback values or the like obtained during, for example, a calibration procedure to expedite the convergence of the directed optical signal 213 to a maximum intensity corresponding to optimum alignment with the center of the selected input/output lens 231 during operation.

Figure 3:
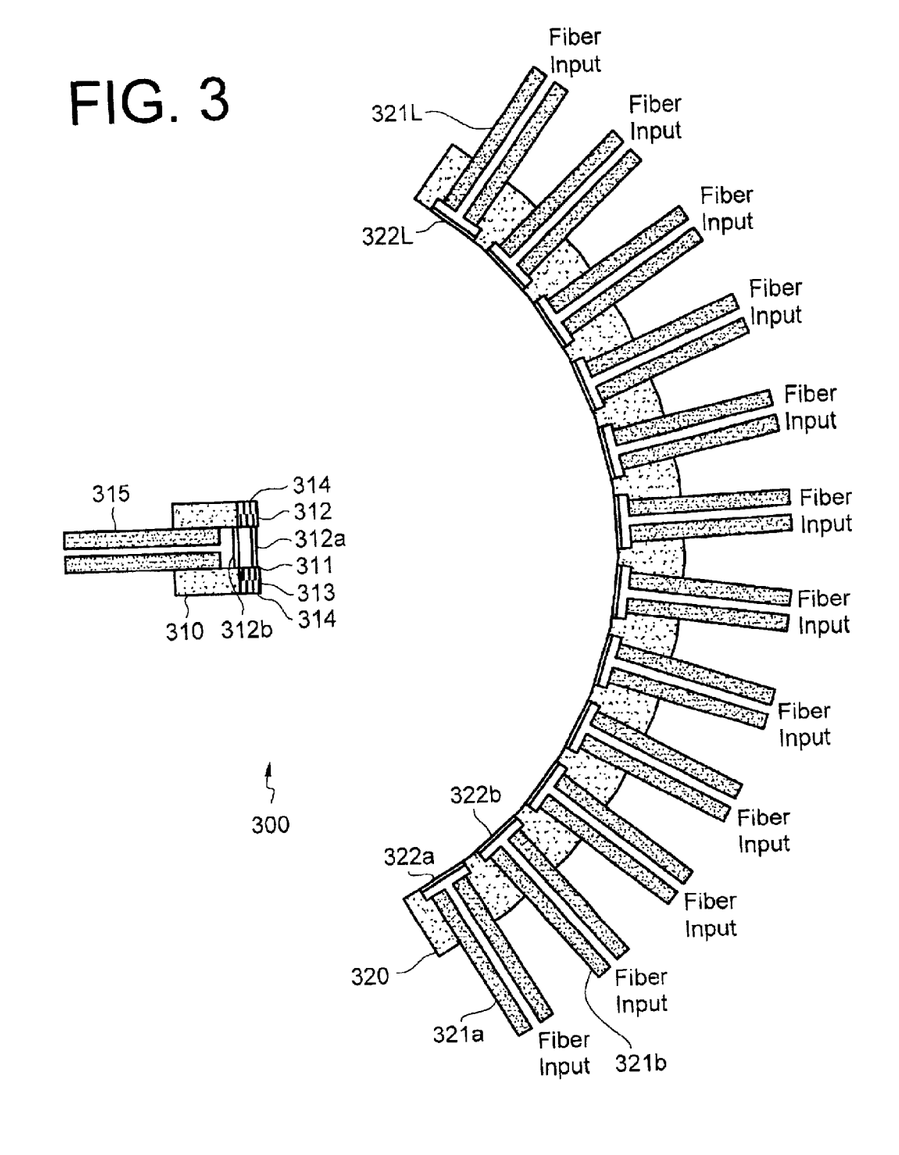
FIG. 3 is a diagram illustrating an exemplary top cross-sectional view of an array input fibers and an output fiber in accordance with the present invention.

FIG. 3 illustrates array 300 of input fibers 321a–321l shown in a top view with the fibers shown in cross section to show respective fiber cores. All twelve input fibers 321a–321l may accept optical input, but only one signal carried on a selected one of input fibers 321a–321l will pass to output fiber 315 when output fiber lens 312a is in the proper position. It should be noted that lenses 312a and 312b and 322a–322l may be cylindrical lenses with no focusing power in the vertical direction. Fibers 321a–321l may, in the present embodiment, be manually placed in the grooves provided on substrate 320, which substrate also holds lenses 322a–322l as described in U.S. patent application Ser. No 09/556,793. It should be noted however that lenses described in U.S. patent application Ser. No 09/556,793, are primarily arranged with an optical axis perpendicular to the plane of the substrate whereas, in accordance with various exemplary embodiments of the present invention, optical micro-elements or lenses may be aligned with the optical axis parallel to the plane of the substrate. Fiber 315 may further be manually placed on substrate 310 which substrate holds lenses 312a and 312b and micromachine actuator 314 which is preferably a comb drive actuator to be described in greater detail hereinafter and may be further described in related U.S. Provisional Application Serial No. 60/174,164 as cited herein above. Micro-machine actuator 314 selects the angle of acceptance from input fibers 321a–321l to output fiber 315. It should be noted that while the exact manufacturing method for various portions of the exemplary fiber optic switch in accordance with the present invention may vary, reactive ion etching may be used to configure etched lenses in a preferred embodiment. Further, conventional deposition techniques may be used to deposit metal structures comprising, for example, micro-machine actuator 314 or comb drive, as well as guides for the fiber positioning which may be constructed from a suitable metal including, for example, Silicon.

Figure 4:
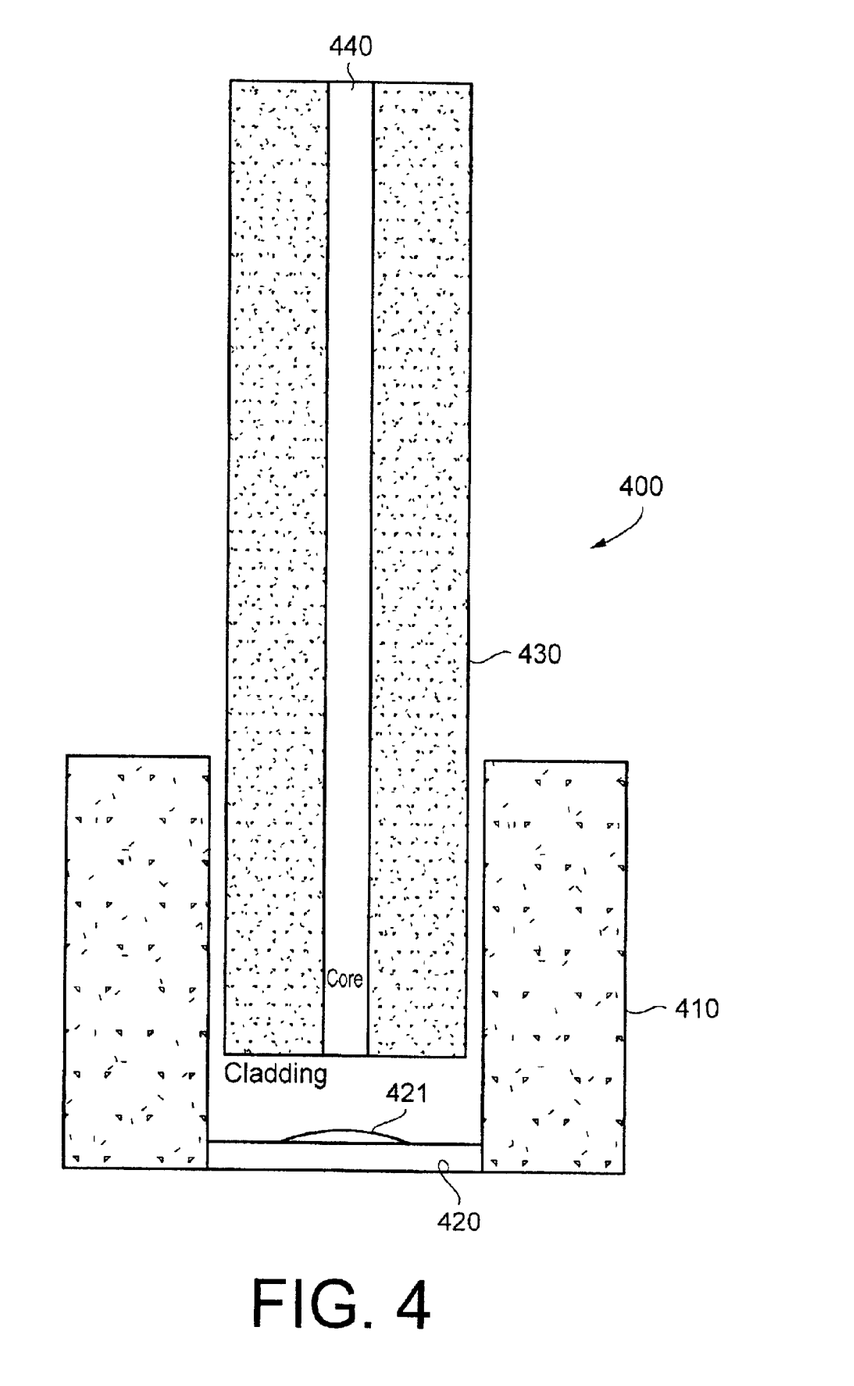
FIG. 4 is a diagram illustrating a cross-sectional view of an exemplary fiber input in accordance with the present invention.

FIG. 4 illustrates an exemplary input fiber 440 with its optics. As will be appreciated, input fiber 440 is similar to exemplary output fibers however does not require a comb drive to move lens 421. Lens 421 is preferably an etched lens as opposed to a ball lens in alternative exemplary embodiments, and may be fabricated at the same time as the movable lens for the output fiber by reactive ion etching.

Figure 5:
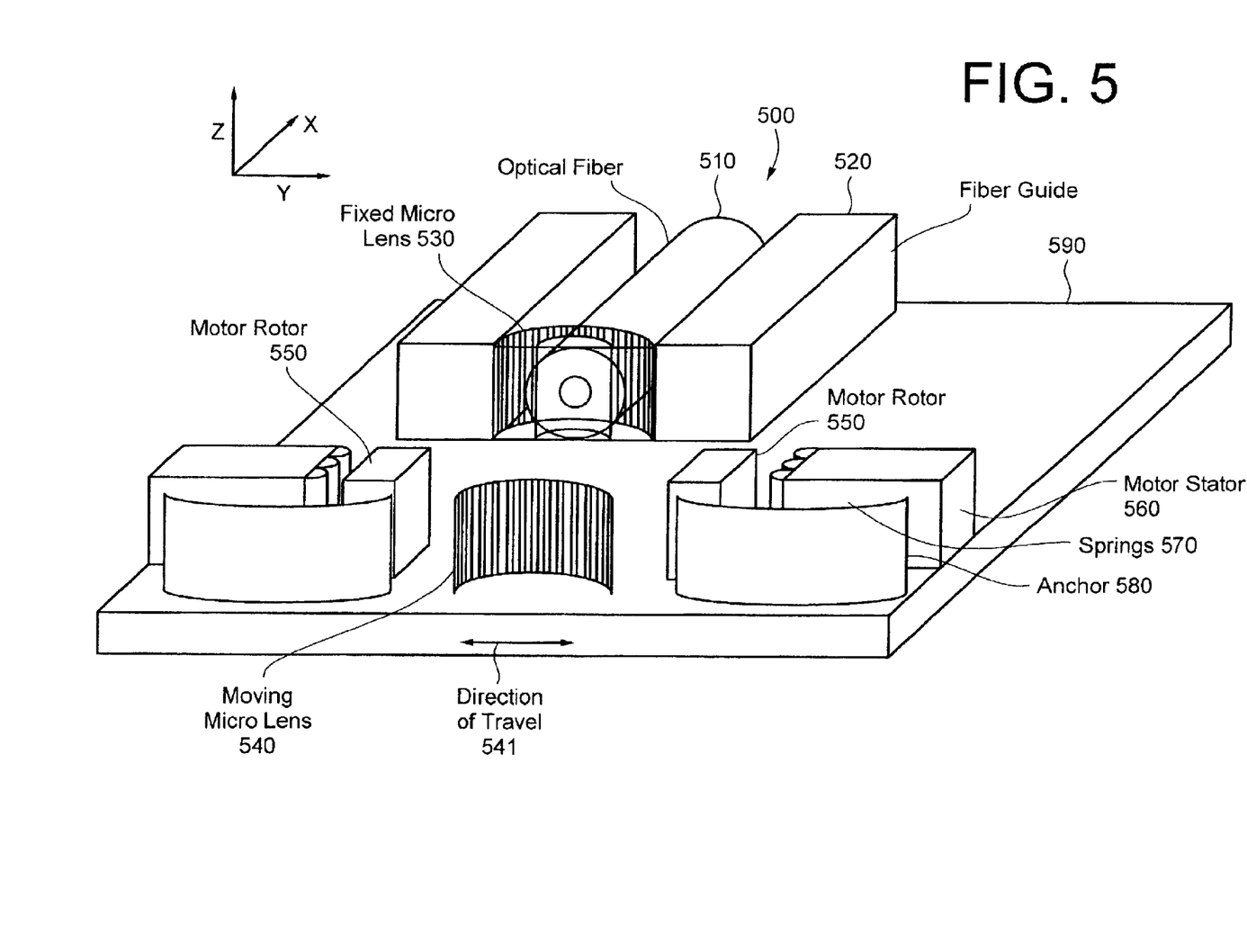
FIG. 5 is a diagram illustrating an exemplary fiber optic multiplexer linear motor and optical micro-element assembly in accordance with the present invention.

Thus, in accordance with various exemplary embodiments of the present invention, a fiber optic multiplexer linear motor and optical microelement assembly 500 is illustrated in FIG. 5. Optical fiber 510 may be placed in fiber guide 520 and positioned such that the end of optical fiber 510 abuts fixed optical micro-element 530. Movable optical microelement 540 may be positioned along direction of travel 541 by the action of motor rotor 550 and motor stator 560 comprising an electrostatic comb drive. As can be seen, motor rotor 550 pieces are fixed to the edges of movable optical micro-element 540 such that motor rotor 550 pieces cause the linear motion of movable optical micro-element 540 along direction of travel 541. It should be noted that springs 570 may be used to establish return positions of movable optical micro-element 540 preferably to a center position and may be anchored to substrate 590 by anchors 580. Accordingly, motion may be achieved in either direction by energizing the appropriate motor stator 560 corresponding to the desired direction. Alternatively, springs 570 may be omitted and complimentary voltages applied to the stator on the opposite side of the direction of pull. In addition, feedback mechanisms may be used to determine that the position of movable optical micro-element 540 has reached a desired position.

Further in accordance with various exemplary embodiments of the present invention, the position of movable optical micro-element 540 may be set using a series of, for example, step voltages which correspond to the desired position of optical micro-element 540 with respect to one of the plurality of input/output fibers in an array. The preferred position corresponds to a maximum intensity of an optical signal coupled between an input/output fiber and a selected one of the input/output fibers in an array and may be determined empirically, using feedback, using stored position information, or the like.

Figure 6:
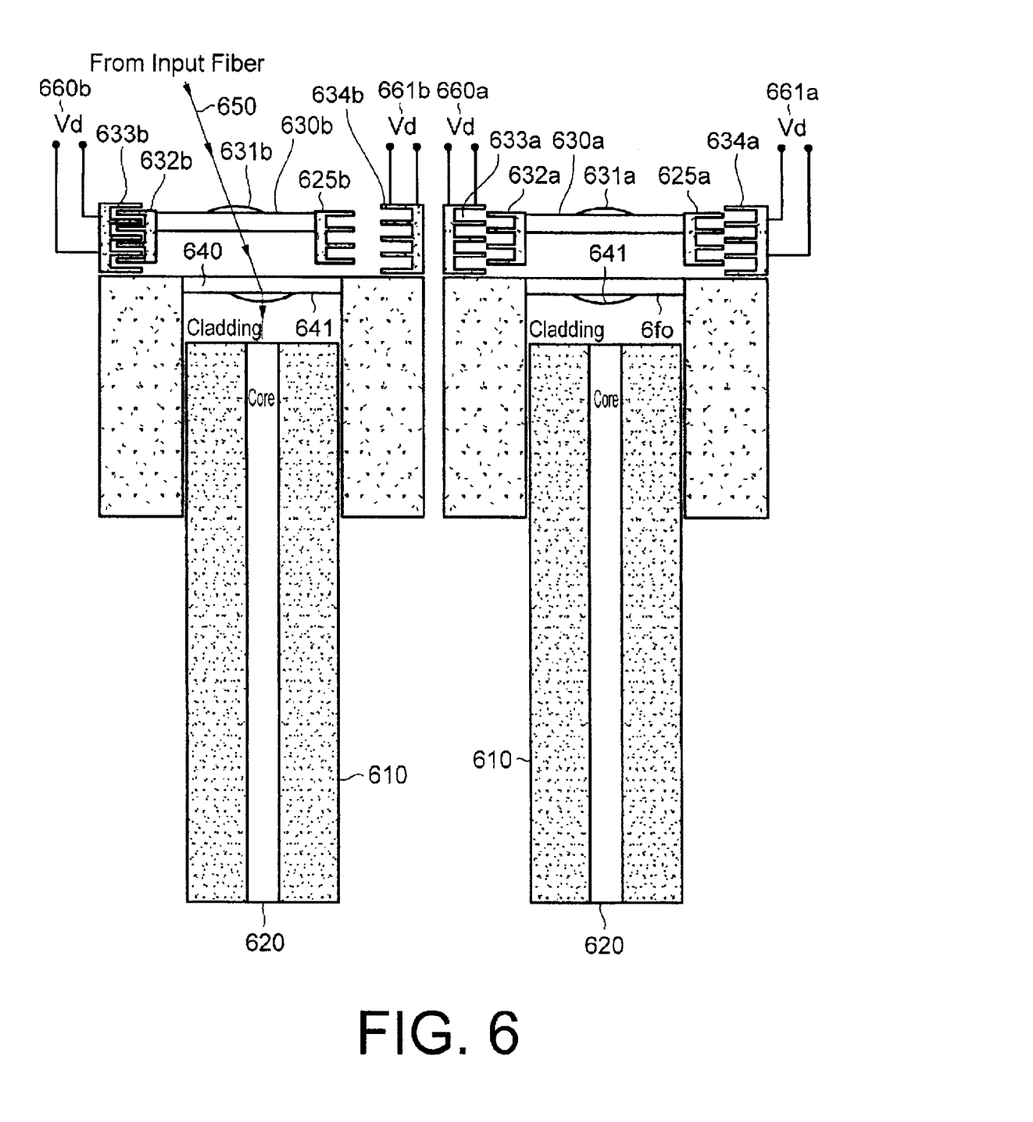
FIG. 6 is a diagram illustrating cross-sectional views of exemplary output fibers in accordance with the present invention.

In accordance with various alternative exemplary embodiments, FIG. 6 illustrates output optics and fiber for an exemplary fiber optic switch in accordance with the present invention. As can be seen, movable optical micro-element 631a is in the undeflected position, while movable optical micro-element 631b is deflected such that it will accept light signal 650 from a left most input fiber (not shown). It should be noted that voltages 660a–b and 661a–b, applied to comb drive stators 633a–b and 634a–b controls the position of lenses 631a–b by acting on corresponding comb drive rotors 632a–b and 635a–b.

The invention being thus described, it will be obvious that the invention may be modified in various ways. Such minor variations however are not to be regarded as a significant departure from the invention and all such modifications are intended where appropriate to fall within the scope of the appended claims.

We claim:

1. An optical micro-switch comprising:
a first optical input/output port;
a plurality of second optical input/output ports; and
an optical guiding assembly operatively coupling first optical input/output port to at least one of said plurality of second optical input/output ports along one of plural optical paths, said optical guiding assembly including,
a horizontal electrostatic comb drive, and
an optical micro-element operably connected to said comb drive,
said comb drive moving said optical micro-element to plural positions greater than two and corresponding in number to plural input/output ports, to direct an optical signal between said first optical port and a selected one of said second optical input/output ports.

2. The optical micro-switch of claim 1, wherein at least one of said input and output ports has plural channels.

3. The optical switch of claim 1, further comprising an actuator assembly that includes said horizontal electrostatic comb drive.

4. The optical switch of claim 1, wherein the optical micro-element includes a lens mounted to have an intended optical path generally parallel to said generally planar substrate.

5. The optical switch of claim 1, wherein the optical micro-element includes an optical glass ball lens.

6. A method for switching an optical signal between a first optical input/output port and at least one of a plurality of second optical input/output ports the method comprising:

a) providing said first and second optical input/output ports in an arrangement generally parallel to a generally planar supporting substrate;

b) providing a micro-optical element between said first optical input/output port and said plurality of second optical input/output ports, an optical path generally parallel to said supporting substrate being defined between said first optical input/output port and said micro-optical element;

c) directing the optical signal between the first optical input/output port and a selected one of the plurality of second optical input/output ports by shifting said micro-optical element in a direction transverse to said optical path and wherein there are at least three second optical input/output ports, said step c) of directing switching said optical micro-element to plural positions corresponding in number to the number of said plural second optical input/output ports.

* * * * *